United States Patent

Crabb et al.

[15] 3,635,317

[45] Jan. 18, 1972

[54] BRAKE CONTROL SYSTEM WITH TRANSMISSION INTERLOCK

[72] Inventors: Elmer R. Crabb, Morton; Larry G. Warren, Peoria, both of Ill.

[73] Assignee: Caterpillar Tractor Co., Peoria, Ill.

[22] Filed: Dec. 17, 1969

[21] Appl. No.: 885,700

[52] U.S. Cl. ............................. 192/4 A, 137/596, 188/170
[51] Int. Cl. ........................................................ F16h 57/10
[58] Field of Search ................................. 192/4 A; 188/170

[56] References Cited

UNITED STATES PATENTS

| | | | |
|---|---|---|---|
| 2,299,475 | 10/1942 | Farmer | 192/4 A |
| 2,330,739 | 9/1943 | Piron | 188/170 |
| 2,904,146 | 9/1959 | Codlin | 192/4 A |
| 3,050,165 | 8/1962 | Day et al. | 192/4 A |
| 3,181,667 | 5/1965 | Lohbauer et al. | 192/4 A |
| 3,528,707 | 9/1970 | Casey | 188/170 |
| 3,589,484 | 6/1971 | Lammers et al. | 192/4 A |

*Primary Examiner*—Mark M. Newman
*Assistant Examiner*—Warren Olsen
*Attorney*—Fryer, Tjensvold, Feix, Phillips & Lempio

[57] ABSTRACT

A control system for a vehicle having a parking brake and a transmission is provided with two simple spring actuated devices which function to automatically place the transmission in a neutral position and engage the parking brake when certain predetermined conditions occur in the system. The system is further constructed so that the parking brake acts as an emergency braking means when fluid pressure in the system drops below a predetermined level.

4 Claims, 1 Drawing Figure

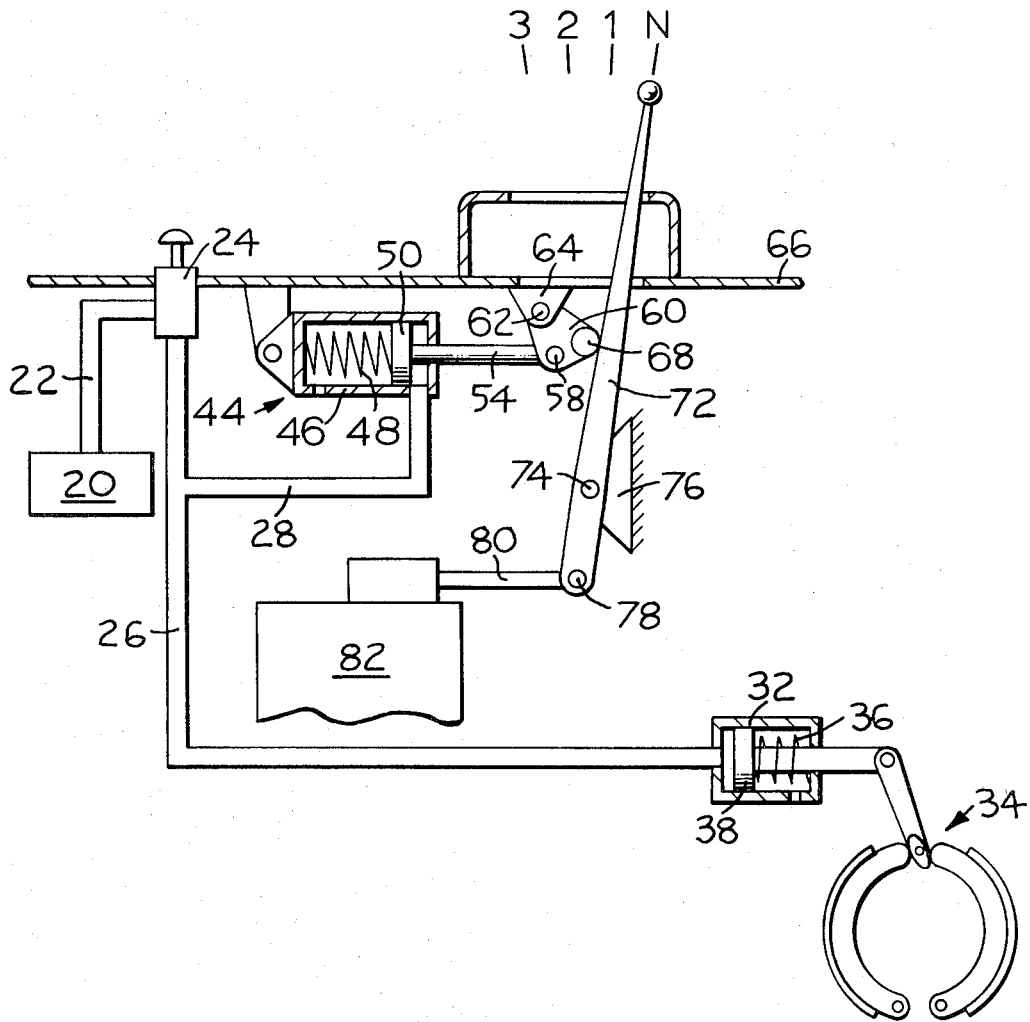

BRAKE CONTROL SYSTEM WITH TRANSMISSION INTERLOCK

BACKGROUND OF THE INVENTION

This invention relates to a control system employed on a vehicle for effecting automatic disengagement of a transmission upon application of the vehicle's parking brake.

The invention is particularly applicable upon machines having engines of sufficient torque to overpower the parking brake. Many present day machines have warning devices, such as a dash-mounted indicator and/or a buzzer, which operate to indicate to the operator when the parking brake is engaged. However, there are many situations where the operator either is not aware that the warning devices are on or has chosen to ignore the warning devices and has driven the machine with the parking brake applied. The resulting heat buildup soon destroys the parking brake lining, thereby making it useless as a parking brake or as an auxiliary brake during an emergency situation.

Accordingly, it is an object of the present invention to provide a control system which will automatically engage the parking brake and simultaneously place the transmission of the vehicle in a neutral position as the parking brake is engaged.

Another object of this invention is to provide a control system which will maintain the transmission in a neutral position until the parking brake is released to prevent the machine from being driven inadvertently with the parking brake engaged.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING

The drawing is a schematic view of the parking brake control system wherein certain components of the control system are shown in cross section.

DETAILED DESCRIPTION OF THE PREFERRED EMBODIMENT

As shown in the drawings, a suitable air source 20 contains pressurized air for delivery through a conduit 22 to a hand actuated control valve 24. The control valve 24 is a spring loaded two-position valve which is normally biased to a closed position. An example of such a control valve is shown in FIGS. 2 and 3 of U.S. Pat. No. 3,095,244.

When the valve 24 is moved to a first or open position, pressurized air is delivered from the air source 20 to a pair of conduits 26 and 28. When the valve 24 is in the open position, the air pressure in conduit 22 overcomes the spring force and holds the valve in open position, However, if the air pressure in conduit 22 drops below a predetermined level, the spring will close the valve. When the control valve 24 is moved to a second or closed position, fluid communication is blocked between the air source and the conduits 26 and 28 and the air in these conduits is exhausted to the atmosphere through an exhaust port (not shown) in the control valve 24.

The conduit 26 communicates with a spring loaded cylinder 32 which is operable to actuate a conventional parking brake 34 by means of a spring 36 which urges a piston 38 to the left to engage the brake when air is evacuated from the head end of the cylinder 32. Thus, the brake 34 will be engaged when the control valve 24 is in closed position since at this time the conduit 26 will be vented to the atmosphere through the control valve. However, when the control valve 24 is moved to an open position, pressurized air is delivered through the conduit 26 to the head end of cylinder 32 which moves the piston 38 to the right thereby compressing the spring 36 and releasing the brake 34.

The conduit 28 communicates with a load cylinder generally shown at 44. The load cylinder 44 comprises a cylinder 46 which contains a spring 48 which normally biases a piston 50 to the right as shown in the drawing. However, when the control valve 24 is in an open position, pressurized air from the air source 20 is delivered through the conduit 28 to the head end of cylinder 46 and moves the piston 50 to the left thereby overcoming the bias of spring 48.

The piston 50 is provided with a rod 54 which is pivotally connected at pivot point 58 to a crank 60. The crank 60 is pivotally connected at 62 to a plate 64 which is fixedly secured to the vehicle frame 66. The crank 60 is also provided with a rodlike member 68 which engages a transmission gear shift lever 72 and forces the lever into a neutral position when the control valve 24 is closed and the piston 50 is moved to the position shown under the influence of spring 48.

The gear shift lever 72 is pivotally connected at 74 to a portion of the vehicle frame shown at 76. The lower end of the gear shift lever 72 is pivotally connected at 78 to a rod 80 which operates to shift the transmission shown at 82 to the gear indicated by the marking (3, 2, 1 and N) at the upper end of the gear shift lever 72.

The operation of the system may be summarized as follows. When the control valve 24 is moved to an open position, pressurized air from the source 20 is delivered to the conduit 26 and moves the piston 38 of the parking brake cylinder 32 to the right which releases the parking brake. Simultaneously, pressurized air is delivered from the source 20 to the conduit 28 and then to the valve 44. Pressurized air from the conduit 28 enters the cylinder 46 and moves the piston 50 to the left overcoming the bias of the spring 48. Movement of the piston 50 to the left also causes the crank 60 to move in a clockwise direction (about pivot 62) which allows the gear shift lever 72 to be manipulated to any desired gear in a conventional manner.

When the control valve 24 is moved to a closed position, pressurized air from the air source 20 is blocked from the conduits 26 and 28 and any air in these conduits and the cylinders 32 and 46 is vented to the atmosphere. Venting the air in conduit 26 to the atmosphere allows the spring 36 to move the piston 38 to the left, which causes engagement of the parking brake 34. Simultaneously, venting the conduit 28 to atmosphere allows the spring 48 to move the piston 50 to the right thereby causing counterclockwise movement of the lever 60 which forces the gear shift lever 72 to shift the transmission into a neutral position as shown in the drawing.

Thus, it should be observed that any time the pressure drops below a predetermined level (as determined by springs 36 and 48) or if the control valve 24 is moved to a closed position, the parking brake 34 will automatically engage and the transmission 82 will automatically be placed in a neutral position. Consequently, if the air pressure in the system should suddenly be lost, the parking brake will automatically engage and operate as an emergency brake.

It should also be observed that the system provides a safety means for protecting the lining of brake 34 by making inadvertent movement of the machine difficult when the parking brake is engaged. This safety provision arises because when the parking brake 34 is engaged, the transmission is automatically placed in neutral position by action of the valve 44. In order for an operator of the vehicle to operate the machine without encountering substantial resistance from spring 48, he must first move the control valve 24 to an open position so that the gear shift lever 72 may be easily moved out of its neutral position. However, in the event the air pressure is lost through a broken conduit and the machine stops in a position where it would create a hazard to other vehicular traffic, the operator can manually overcome the resistance of spring 48 to shift the transmission lever so that the machine may be moved.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a system for a vehicle having at least one parking brake in addition to the normal vehicle brake system, said parking brake being used to normally hold the vehicle when unattended, a transmission, and a gearshift lever associated with the transmission, the combination comprising: a single source of fluid under pressure, a first load cylinder including means for normally engaging said parking brake and responsive to fluid pressure to release said brake, a second load cylinder including rod means for contacting and moving said gearshift lever to a neutral position and responsive to fluid pressure to release the gearshift lever from said neutral position, a single and common conduit means communicating operating fluid from said fluid source to the first and second load cylinders, and control valve means for manually closing the single and common conduit means to prevent communication of fluid to said first and second load cylinders whereby the gearshift lever will be moved to its neutral position automatically and the parking brake will be engaged automatically.

2. The invention of claim 1 wherein said control valve means is spring-biased to a closed position and, when open, is held open by operating fluid pressure, whereby the transmission will be neutralized and the parking brake engaged upon loss of operating fluid pressure at the fluid source.

3. The invention of claim 1 wherein the gearshift-lever biasing means comprises a resilient spring arranged to be compressed by manually forced operation of the gearshift lever.

4. The invention of claim 2 wherein the gearshift-lever biasing means comprises a resilient spring arranged to be compressed by manually forced operation of the gearshift lever.

* * * * *